O. EICK.
APPARATUS FOR CLEANSING BOTTLES.
APPLICATION FILED DEC. 26, 1907. RENEWED MAR. 25, 1911.
1,110,615.
Patented Sept. 15, 1914.
7 SHEETS—SHEET 1.
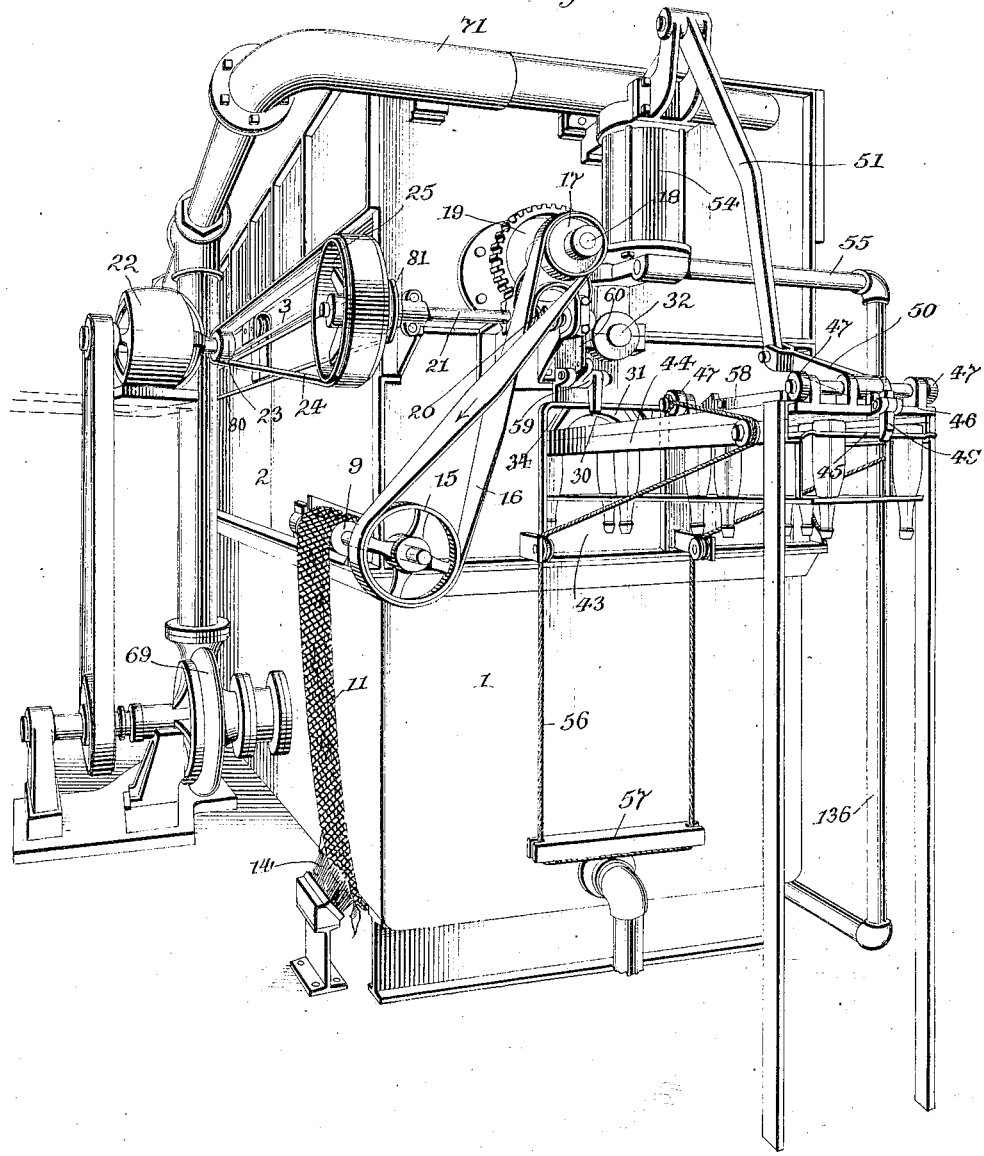

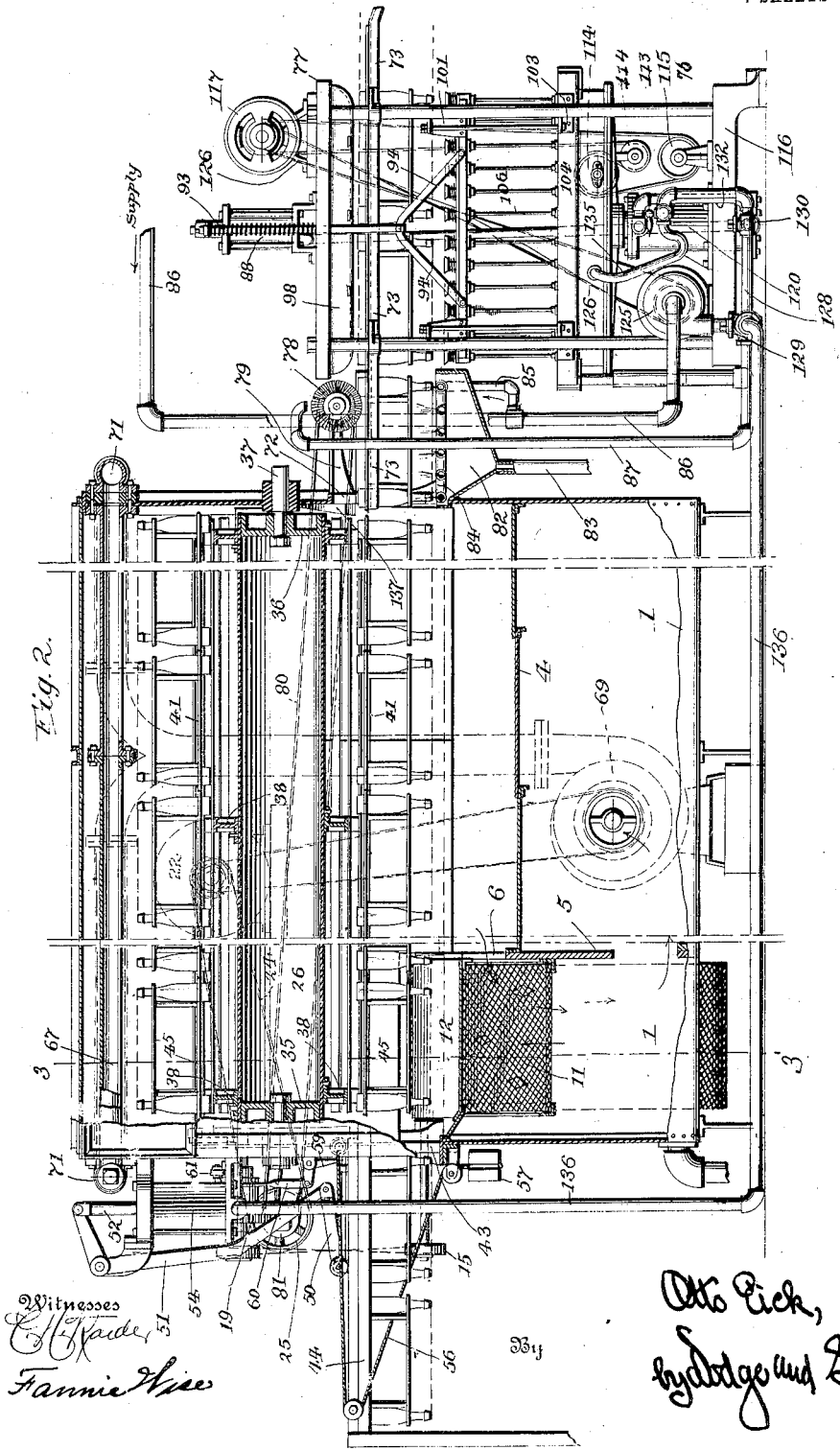

O. EICK.
APPARATUS FOR CLEANSING BOTTLES.
APPLICATION FILED DEC. 26, 1907. RENEWED MAR. 25, 1911.
1,110,615.
Patented Sept. 15, 1914.
7 SHEETS—SHEET 3.
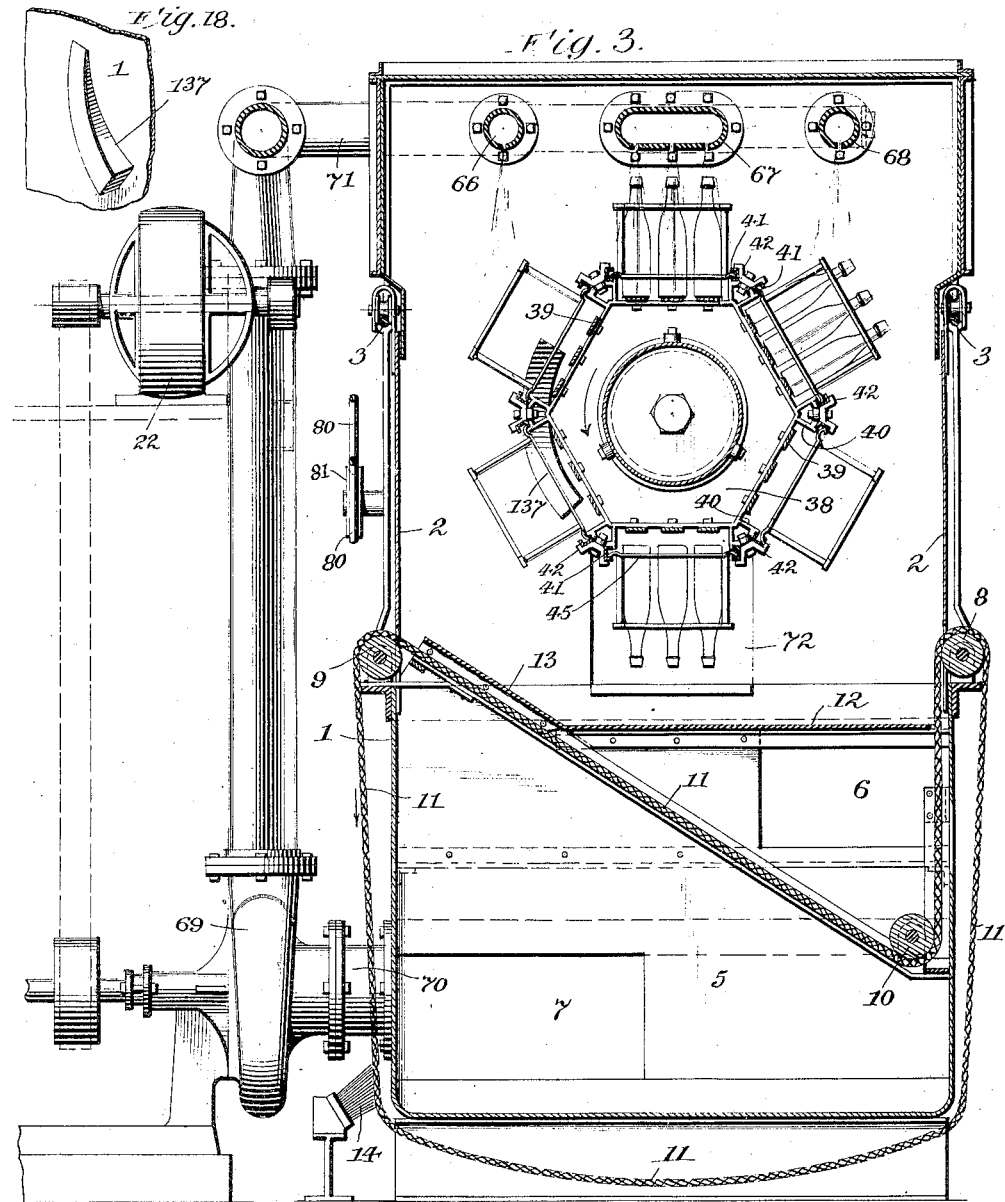
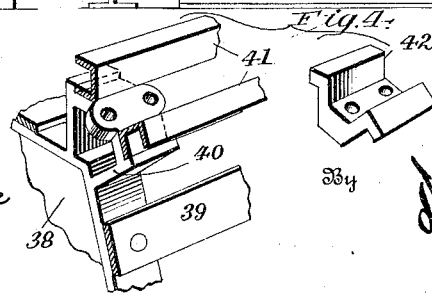
Witnesses
Inventor:
Otto Eick,
By Dodge and Sons,
Attorneys.

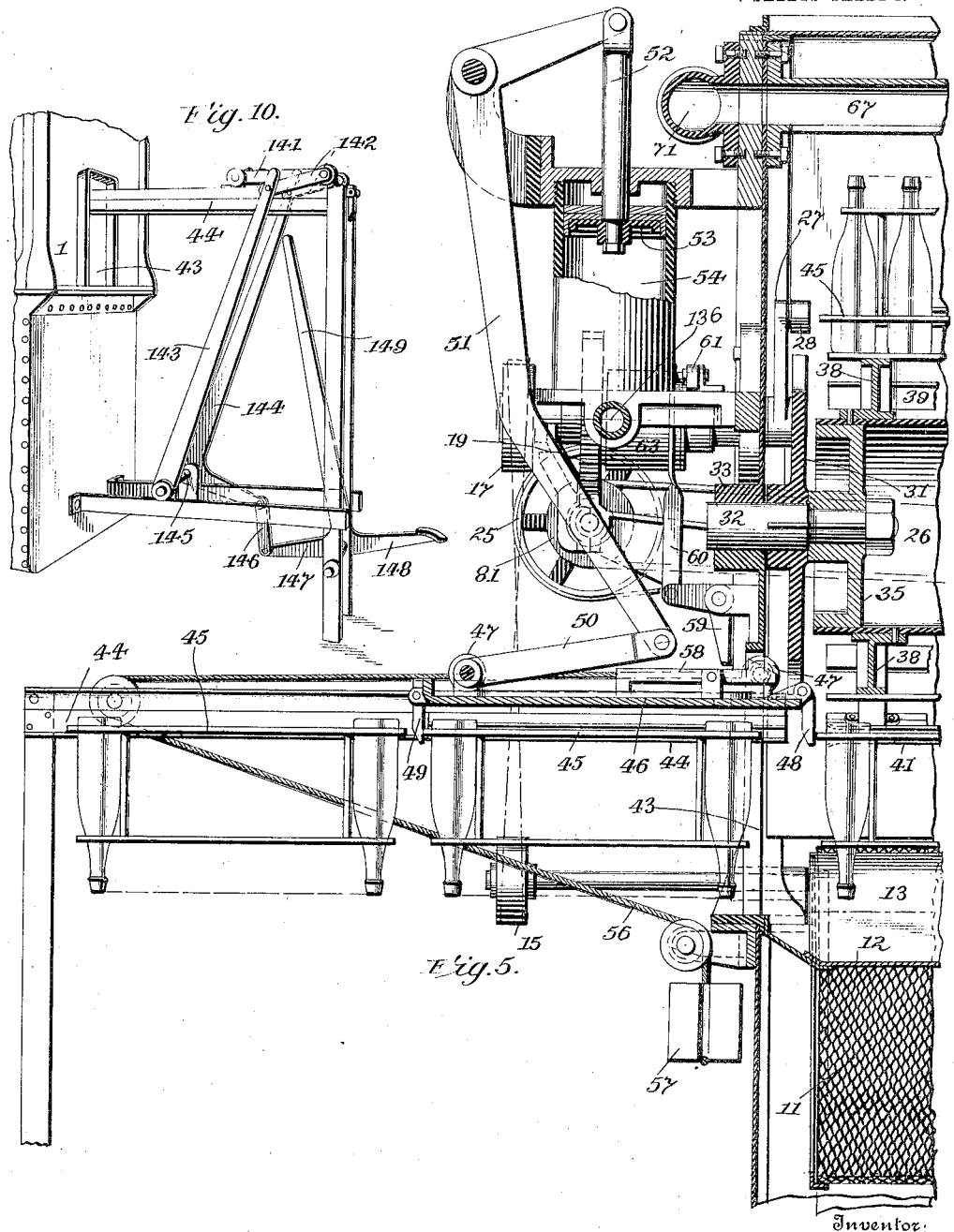

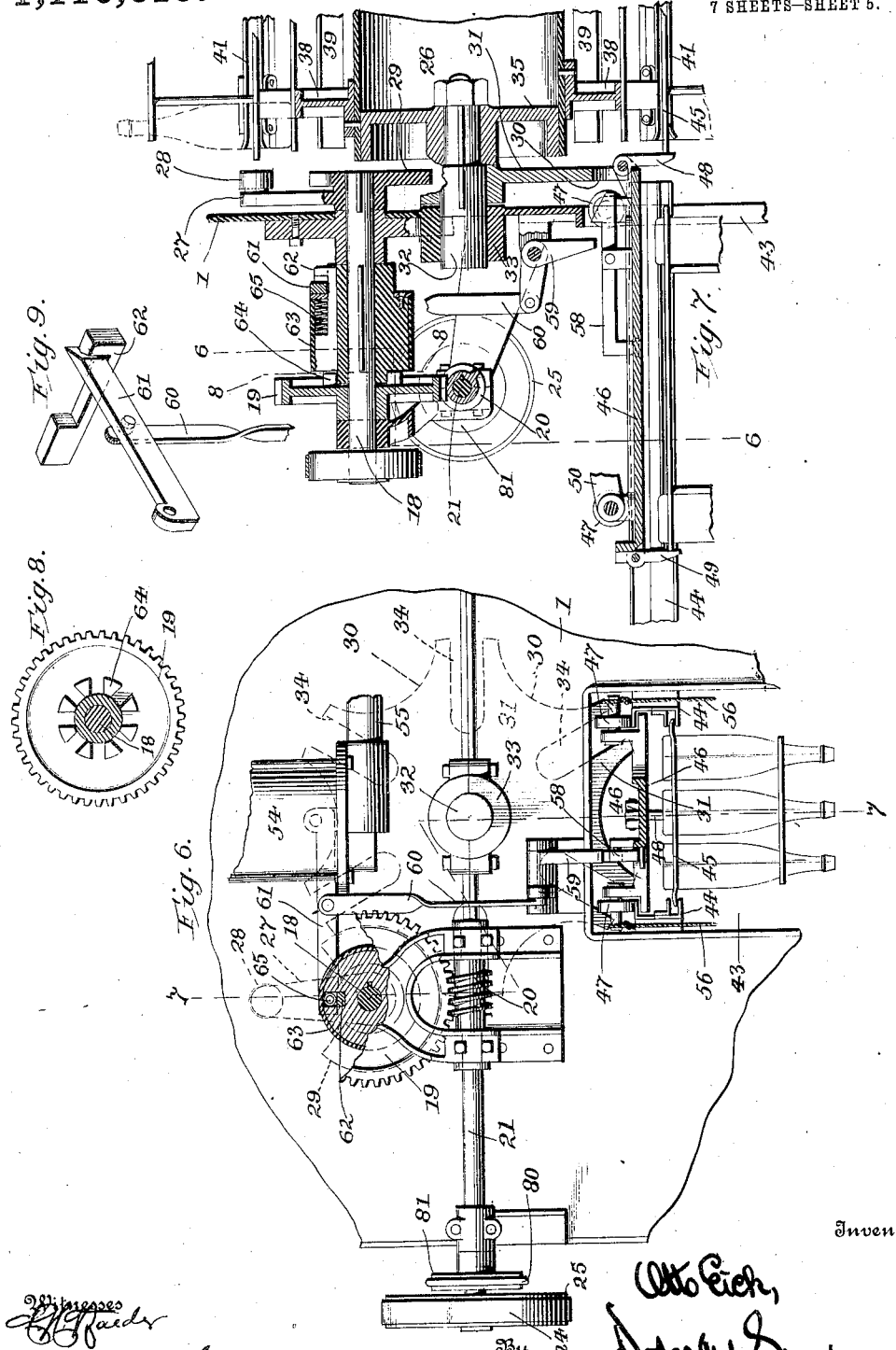

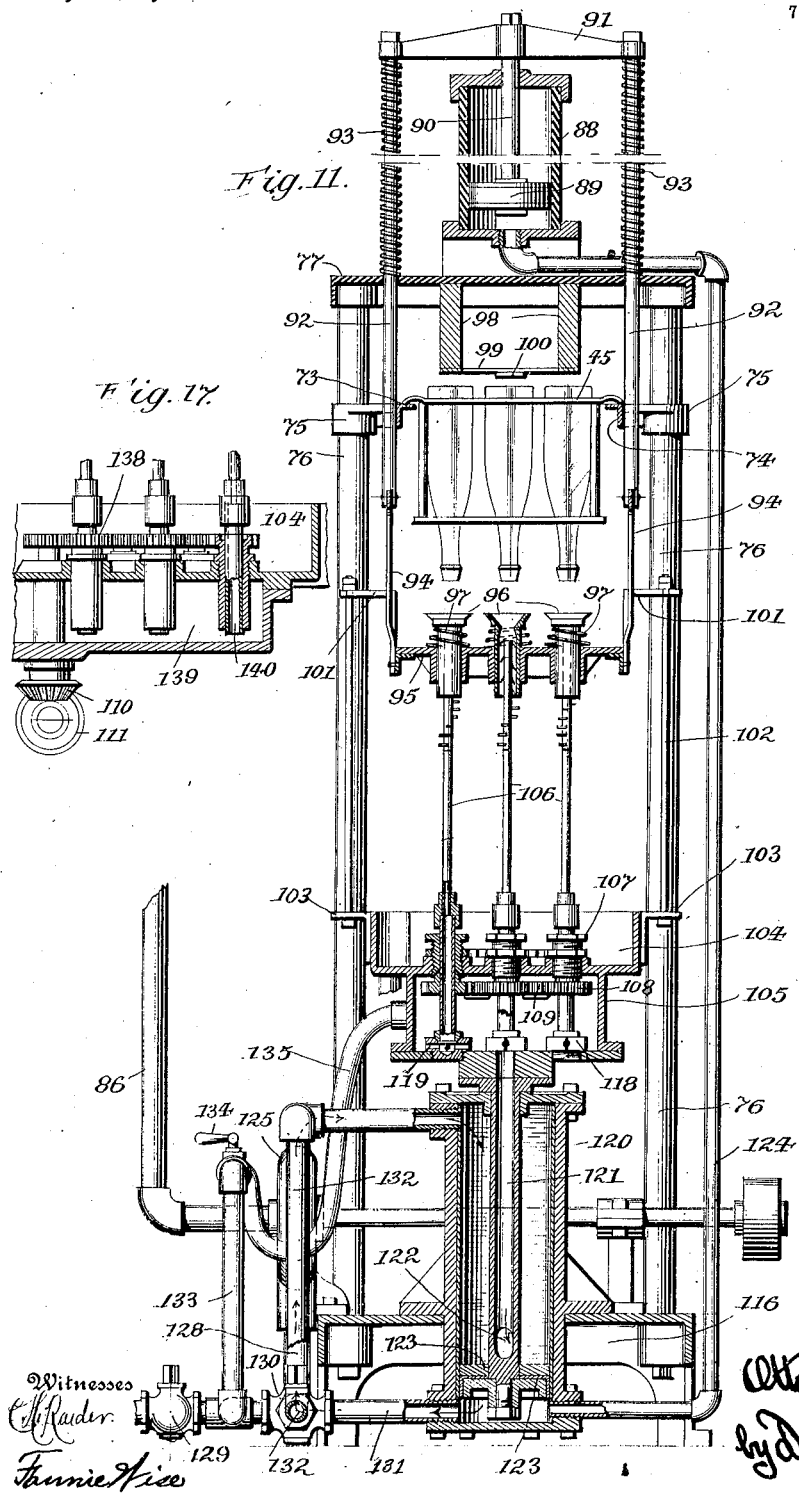

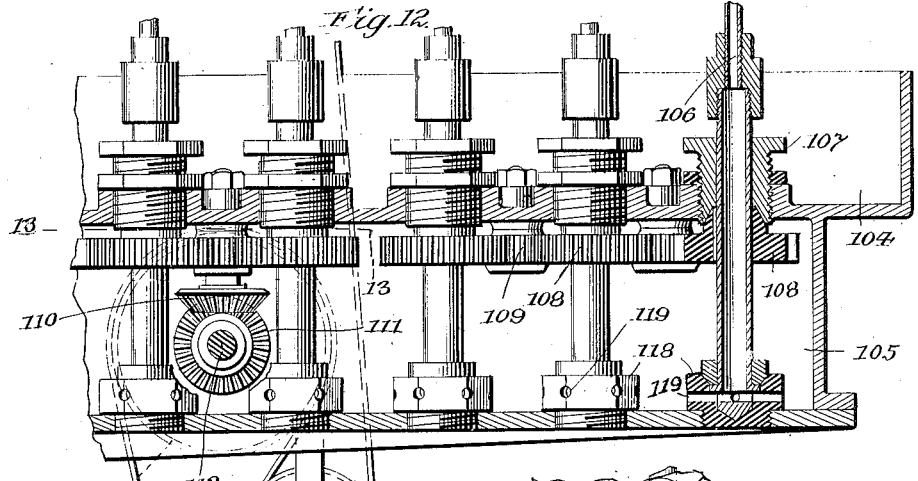

UNITED STATES PATENT OFFICE.

OTTO EICK, OF BALTIMORE, MARYLAND.

APPARATUS FOR CLEANSING BOTTLES.

1,110,615. Specification of Letters Patent. Patented Sept. 15, 1914.

Application filed December 26, 1907, Serial No. 408,024. Renewed March 25, 1911. Serial No. 616,832.

*To all whom it may concern:*

Be it known that I, OTTO EICK, a citizen of the United States, residing at Baltimore, State of Maryland, have invented certain new and useful Improvements in Apparatus for Cleansing Bottles, of which the following is a specification.

My present invention pertains to an improved apparatus for cleansing bottles, the construction and advantages of which will be hereinafter set forth, reference being had to the annexed drawings, wherein:

Figure 1, is a perspective view of the forward or in-feeding end of the apparatus; Fig. 2, a longitudinal sectional elevation of the apparatus; Fig. 3, a transverse vertical sectional view taken on the line 3—3 of Fig. 2; Fig. 4, a detail perspective view showing a portion of the track supporting brackets or frames, two of the tracks and one of the clamping members therefor; Fig. 5, an enlarged sectional elevation of the forward end of the tank and the mechanism employed to advance the bottles into the tank and also to rotate the bottle-carrying frame; Fig. 6, a transverse vertical sectional view taken on the line 6—6 of Fig. 7; Fig. 7, a longitudinal sectional view taken on the line 7—7 of Fig. 6; Fig. 8, a detailed sectional view taken on the line 8—8 of Fig. 7; Fig. 9, a perspective view of a portion of the mechanism employed to hold the driving clutch out of action; Fig. 10, a perspective view, showing a modification whereby the bottle-supporting racks may be advanced into the tank manually; Fig. 11, a vertical sectional view of that portion of the machine to which the bottles are subjected to the action of a series of rotatable spindles; Fig. 12, an enlarged sectional view showing the means employed for driving the spindles; Fig. 13, a horizontal sectional view on the line 13—13 of Fig. 12; Fig. 14, a sectional perspective of the cylinder and the allied parts, employed for raising the mouth piece plate and the spindles, and controlling the flow of water to the spindles and to the cylinder, which actuates the crate advancing means at the forward end of the machine. Figs. 15 and 16, sectional views showing the different positions of the three-way valve employed to control the admission of the fluid to the cylinder which raises the spindles and supplies water thereto; Fig. 17, a sectional elevation of a modified form of gearing employed in connection with the spindles; and Fig. 18, is a detail perspective view of a cam employed to position the crates.

The main object of my invention is to provide an apparatus wherein bottles placed in crates may be thoroughly washed and cleansed interiorly and exteriorly, so that when they are finally discharged from the apparatus they may be dried and used without further cleaning.

A further object of the invention is to provide means for withdrawing the detached labels and foil from the cleaning tank.

A further object of the invention is to provide means whereby a single attendant may so control the operation of the machine that the bottle-holding crates may be fed into the machine periodically and discharged therefrom and finally subjected to the action of a series of spindle brushes or spindles for the purpose of thoroughly and finally cleaning out the bottles with fresh water.

Referring to the drawings, 1 denotes a tank preferably provided on opposite sides with sliding doors 2, which are sustained by tracks 3 extending longitudinally of the tank. The tank is provided throughout a portion of its length with a false bottom 4, the bottom terminating short of the forward end of the machine, adjacent to a partition 5, said partition, as will be seen upon reference to Fig. 3, being formed with an opening 6 in the upper portion thereof and with a second opening 7 in the lower portion thereof.

A roller 8 is located at one side of the tank, and a second roller 9 is mounted upon the opposite side of the tank, said rollers being adjacent to the forward or in-feeding end of the tank. A third roller 10 is located in the tank at a point adjacent to the bottom thereof, or at a point below the opening 6, and a flexible reticular belt 11 passes over the rollers 8 and 9, beneath the roller 10, and beneath the bottom of the tank, as is clearly shown in Fig. 3. Said belt which may be termed a movable intercepter will preferably be formed of interwoven wire which, while being perfectly flexible and open, nevertheless presents a surface which will cause the wet labels to adhere thereto.

A cover comprising a horizontally disposed portion 12 and an inclined portion 13 is placed in the tank over the belt so as to prevent the water which is sprayed down upon the bottles as hereinafter set forth from washing the labels off of the belt. A brush 14, (Fig. 3) is located outside of the tank and acts upon the belt to remove the adhering labels and pieces of tinfoil. Any other means may be employed for effecting this same purpose.

The shaft upon which the roller 9 is mounted carries a band wheel 15 about which passes a band 16, said band also passing about a pulley 17 mounted upon a shaft 18, the shaft having loosely mounted thereon a gear 19, which is in mesh with a worm 20, mounted upon a shaft 21. Motion is imparted to the shaft from an electric motor or other source of power 22, through pulley 23, belt 24 and a band wheel 25, the latter being mounted upon the shaft 21. The shaft 18 also serves to impart motion or a step by step rotation to the drum or carrier 26 upon which are mounted the frames and tracks which serve to support and hold the bottle-containing crates or racks. The shaft 18 (see Figs. 6 and 7) has secured to its inner end a casting having an outwardly extending arm 27, which arm in turn carries the roller 28. The casting is also provided with a rounded portion 29 which bears in the complemental curved faces 30 formed in the casting 31 secured to the stub axle or shaft 32 mounted in a bearing 33 in the end wall of the tank. The casting 31 is provided with a series of radially disposed slots 34 into which the roller 28 passes from time to time, and thereby advances the casting 31 and the shaft 32 one step. The mechanism just described is in effect the well known Geneva movement, and for each complete revolution of the shaft 18 the shaft 32 is given one forward step in its revolution. The shaft 32 is readily connected to a head 35 mounted in one end of the drum or carrier 26. A similar head 36 is mounted upon a stub axle 37, being secured in the opposite end of the drum or carrier, the stub axle 37 being mounted in a bearing in the discharge end of the tank.

Secured to the outer face of the drum, adjacent the ends thereof, and at intermediate points, if so desired, are frames 38 provided at the periphery with flat faces to which are secured a series of bars 39 which extend from one frame to the other throughout the length of the tank. These bars as will be seen upon reference to Fig. 3, serve to hold the bottles in position in the crates when the bottles are in their upright position. The frames are also provided with brackets 40, so formed as to receive the channel-shaped tracks 41, the tracks upon each bracket standing back to back and being secured in position by a clip or holder 42 (see Fig. 4), which is bolted to the bracket. The parts are so positioned that when the drum or carrier is at rest, the lowermost pair of tracks will stand adjacent the upper portion of an opening 43 provided in the end of the tank, and also stand in alinement with a pair of fixed tracks 44, located without the tank. Said tracks 44 are adapted to receive the crates containing the bottles, the bottom or cross member 45 of the crates being preferably formed with an outwardly projecting flange (see Figs. 3 and 11) which flanges engage the tracks and maintain the racks or crates in their proper position. A slide or carriage 46 is mounted between the tracks 44, the carriage being held in position with relation to the tracks by the rollers 47 secured in the slide which rest and run upon the upper portions or inwardly projecting flanges of the tracks 44.

The carriage 46 is provided at its forward end with a pawl or finger 48, and at its rear end with a similar finger 49, the fingers being free to swing upwardly as the carriage is moved rearwardly or away from the tank. The fingers, however, lock in their vertical position as the carriage moves forwardly, and as a consequence, the fingers will engage the racks or crates and move them along the tracks 44, and the crate which is next adjacent the tank, into the tank through the opening 43, and on to the tracks 41, which are then standing in alinement with the tracks 44. The inward movement of the carriage is effected through a link 50 which is pivotally connected to the carriage and to the lower end of an elbow lever 51, the opposite end of the lever being in turn connected to the upper end of a piston rod 52, the rod being secured to a piston 53 working in the cylinder 54. Fluid to actuate the piston is admitted into the cylinder through a pipe 136. Means for controlling the flow of the fluid through the pipe will be hereinafter set forth in detail.

In order to draw the carriage rearwardly and thereby permit the pawls 48 and 49 to pass over the crates which are then standing upon the tracks 44, I connect to the carriage, through the medium of a cable or cables 56 a counterweight 57 (see Fig. 1). The carriage 46 has pivotally secured to the upper face thereof the hooked-shaped member 58, the hook acting as the carriage is moved outwardly from the tank to engage the lower arm of a bell crank lever 59, the opposite end of the lever being connected to a link 60, which in turn is pivotally connected to a bar 61, said bar being pivoted at one end and having its opposite end beveled and standing in line with a correspondingly beveled face formed upon a sliding bolt or pin 62, mounted in a sleeve or cylindrical member 63 splined to and rotating with the shaft 18. The bolt or pin 62 is normally pressed toward a series of clutch teeth 64, formed upon the gear 19, by a spring 65. The hook-shaped member 58 is so proportioned and designed that it normally stands in the position shown in Figs. 5 and 7, with the vertical faces of the hook in alinement with the vertically disposed face of the lower arm of the elbow lever 59, so that as the carriage 46 is moved outwardly said hook member comes into contact with the bell crank lever and rocks the same thereby elevating the link 60 and the bar 61 and removing the bar from contact with the bolt 62 permitting the spring 65 to move the bolt inwardly so as to throw it into engagement with the clutch teeth of the gear 19. As a consequence, rotary motion will be imparted to the shaft 18, and the roller 28 will enter the slots 34 and cause a forward movement of the drum, and its allied parts. The rotation of the shaft 18 will continue so long as the carriage 46 remains in its outward position or away from the drum. When, however, the carriage is moved inwardly the beveled face of the hook-shaped member will come into contact with the lower arm of the bell crank lever 59, and as a consequence, will rock the bell crank and draw the link 60 and bar 61 downwardly so that the beveled end of the bar stands in alinement with the beveled face of the locking bolt 62 and will withdraw the bolt so as to free the same from the clutch teeth of the gear 19 thereby permitting the shaft 18 to become idle. The operator who stands at the discharge end of the tank will of course throw the carriage into and out of operation at the proper time, so that there can be no inward movement of the carriage and the crates except at that time when the drum is at rest. This is accomplished by the means hereinafter specifically set forth.

Extending throughout the length of the tank at the upper portion thereof are three pipes 66, 67, and 68. The pipes 66 and 68 are somewhat smaller than the intermediate pipe, and provided with a single slot or series of perforations in the lower portion thereof. The intermediate pipe 67 is provided with three slots or rows of perforations which are so positioned as to stand in alinement with the mouths of the bottles, which are immediately below the same as indicated in Fig. 3. Water is forced into and through the pipes by a pump 69 which pump withdraws the water from the lower portion of the tank through a connection 70, the water being delivered from the pump to the pipes through manifolds 71.

The rear end of the tank is provided with an opening 72, (see Fig. 2), which stands in line with the opening 43 at the opposite end of the tank, and a pair of tracks 73, 74, (Figs. 2 and 11) and sustained by brackets 75 secured upon uprights or columns 76, terminating in line with said opening. Located above the tracks between the tank and the top frame or casting 77, surmounting the columns 76, is a rotary brush 78, the horizontally disposed axle of which is supported in brackets 79 secured to the end of the tank. The brush is so adjusted that it acts upon the bottom of the bottles as they are advanced beneath the same along the tracks 73—74. Motion is imparted to the brush by a belt 80 which passes about a pulley 81 secured upon shaft 21, (see Figs. 1, 2 and 3). Located beneath the brush and at a point below the lower end of the bottles is a pan 82 provided with a drain pipe 83. Mounted within the upper portion of the pan is a series of spray pipes 84, to which water is supplied through a pipe 85 extending from the main water supply 86. Water is also supplied to the brush through a pipe 87.

As the trays or crates with the contained bottles pass along the tracks 73 from over the spray pipes they pass between the uprights or columns 76 and above a series of spindles or spindle brushes which may be, usually projected into the bottles, the spindles being rotated. Mounted upon the upper portion of the top frame 77 is a cylinder 88 in which works a piston 89, the piston rod 90 thereof extending upwardly and being connected with a cross head 91. Draw rods 92 extending downwardly from said cross head pass through openings in the top frame 77. Springs 93 encircle the rods, the springs bearing at their lower ends upon the upper face of the top frame and at their upper ends against the cross head 91. Each draw rod has connected to the lower end thereof a bail-shaped member 94 to the outer ends of which in turn is connected a mouth piece plate 95, said plate being provided with a series of openings in which are mounted a series of mouth pieces 96, the upper portion of each of which is made flaring so as to properly pass over the mouth of a bottle, said mouth pieces being each sustained by a spring 97. Depending from the under face of the top frame 77 are longitudinally disposed ribs or bars 98 which carry at their lower edges a series of cross bars 99 which latter bars in turn support the longitudinally extending bar 100. The longitudinally disposed bars 98 and 100 prevent the bottles from being lifted out of the crates when the mouth pieces are drawn up against the bottle preparatory to the entrance of the spindle or spindle brush into the same. Secured to the mouth piece plate 95 at each corner thereof is a bracket 101, and extending freely through each of the brackets is a rod 102, the lower ends of the rods in turn passing through brackets 103 secured to the side walls of the pan 104 surmounting the gear box 105.

A series of hollow spindles 106 are mounted in bearings 107 secured in the lower portion of the pan 104 or the upper portion of the gear box. Each spindle (see Figs. 12 and 13) is provided with a gear 108 which gears in turn mesh with idlers 109, the shaft of one of said idlers shown in Fig. 12 being extended downwardly and provided with a beveled gear 110 which meshes with a corresponding gear 111 carried by a drive shaft 112. Said shaft receives its motion from a belt 113 (Fig. 2) which latter passes around a pulley carried on the outer end of the drive shaft 112, and likewise about a pulley 114 supported by the gear box on a bracket carried thereby, and about a third pulley 115 carried by a bracket or support mounted upon the base 116. The belt receives its motion from an electric or other motor 117, mounted upon the top frame or plate 77. The lower end of each spindle, as will be seen upon reference to Fig. 11, is mounted in a stepped bearing 118 and a series of openings 119 is formed therethrough, so that the water forced into the gear box, in a manner presently to be described, will be forced through said openings and up through the hollow spindles, when the same are within the bottles. In order to elevate the gear box and the spindles carried thereby, I provide a cylinder 120 carried by the base 116.

The piston rod 121, as will be seen by reference to Fig. 11, is made hollow, the upper end of the rod being connected to the lower portion of the gear box and opening into the same. An opening 122 is formed in the rod at a point above the piston 123. A pipe 124 extends from a point at the lower end of the cylinder and discharges into the lower end of the cylinder 88. The supply pipe 86 is connected with a rotary pump 125. The pump is actuated from the motor 117 through a belt 126 which in turn passes around a pulley mounted upon the pump shaft 127. The discharge 128 of the pump passes to three-way valves 129 and 130, the latter being shown in its two positions in Figs. 15 and 16. A pipe 131 leads from the three-way valve 130 to the lower end of the cylinder 120. A branch pipe 132 leads to the upper portion of the cylinder and discharges above the piston working therein. A branch pipe 133 provided with a hand lever 134 is in communication with the discharge from the pump and a flexible pipe 135 extends from the valve and opens into the gear box 105. This pipe is used when it is desired to supply the gear box directly or independent of the supply which passes through the cylinder. A pipe 136 is connected to one side of the three-way valve 129, said pipe extending forwardly and opening into the lower end of the cylinder 54. The pipe 87 heretofore referred to as supplying the brush 78 with water is connected to the opposite opening of the three-way valve. When the valve 129 is opened so as to connect the pump with the pipe 136, the pipe 87 will be cut off. When the valve is so positioned as to cut off communication with the pump and the valve, the pipes 136 and 87 are then connected so that as the piston 53 moves downwardly in the cylinder, the water will be forced therefrom back through the pipe 136, and through the pipe 87 on to the brush.

By manipulating the valve 130 the operator can cause the gear box and spindle to be raised and lowered. By turning the valve to the position shown in Fig. 16, water will be admitted through the pipe 131, to the lower end of the piston and consequently the piston will be raised, carrying the gear box upwardly and causing the spindles or spindle brushes to pass into the mouth of the bottles. Simultaneously with the upward movement of the piston, water will pass through the pipe 124 and into the lower portion of the cylinder 88 thereby causing the piston therein to move upwardly and, acting in conjunction with the springs to draw the mouth piece plate upwardly toward the inverted bottles and thereby seat the mouth pieces against the bottles which will be moved upwardly through the crate so that the bottoms thereof bear against the under faces of the bars 98 and 100. The bottles are thus held in position so that the brushes may thoroughly act upon the interior faces of the bottles and cleanse the same, the water at the same time being forced through the spindles. In the initial upward movement of the gear box it may be necessary in order to supply the spindles with water, to admit water to the gear box through the flexible pipe 135. When the valve 130 is moved so as to cut off the supply from the pump and to open the pipe 131 into the pipe 132, the piston will be forced downwardly by the weight of the gear box and attendant parts.

The water in the lower portion of the cylinder 120 and the water in the lower portion of the cylinder 88 which passes down to the lower portion of the cylinder 120 through the pipe 124 will pass through the pipe 131, the valve 130, and into the upper portion of the cylinder 120 through the pipe 132. Thus the upper portion of the cylinder 120 will be filled with water and when the piston 123 is again forced upwardly the water in the cylinder 120 will be forced through the opening 122 through the hollow piston rod 121 into the gear box 105, and through the openings 119 which communicate with the interior of the spindles. From this it will be seen that the water which is used to first elevate the gear box and spindles and also the mouth piece plate, is afterward forced through the spindles in the act of cleaning the bottles by the brushes. The operator standing adjacent the valves 129 and 130 can by manipulating the valve handles shown in dotted lines in Fig. 14, control the entire operation of the machine, and so time the movement that the crates with the bottles therein will be introduced into the machine while the supporting drum or carrier is at rest with a pair of the tracks carried thereby in alinement with the tracks 44 located at the forward or feed end of the machine. Assuming that a sufficient number of crates have been introduced into the tank to completely fill the full length of the tracks 41, which are then in line with the tracks 44, and also in line with the tracks 73—74 the inward movement of an additional crate will force the crates along the tracks 41 and discharge the last crate from the tank onto the tracks 73—74. If a crate has already been positioned upon such tracks over the spray pipe, said crate with its bottles will be moved over the spindles into position to be operated upon by the spindles. The operator will then close the valve 129 so as to withdraw the carriage 46 and the valve 130 will be manipulated to cause an upward movement of the spindles into the bottles. The alternate filling and emptying of the bottles in the tank, or spray to which they are subjected while in the tank, the spray to which they are subjected after they pass out of the tank on their way to the spindles and the cleaning of the bottles by the spindles renders the bottles perfectly clean and ready for use.

In order that the crates may move rearwardly upon the tracks 41, to a slight extent so that the end crate mounted upon the drum of the carrier will not contact with the crate which has just been moved outwardly, there is provided upon the end wall of the tank a cam-shaped block or member 137 shown in Figs. 2, 3 and 18. As the drum rotates in the direction of the arrow shown in Fig. 3, the cam acts upon the crates and moves them slightly toward the feed end of the machine so as to secure a clearance between the said crate and the crate which has just been moved out of the tank.

In Fig. 17 I have shown a slightly modified form of gearing for driving the spindles. The gears, designated by 138, are in this instance mounted above the chamber 139 into which the water is forced and from which it passes out through the hollow spindles 140. This construction is advantageous over the other construction in that the gears do not rotate in the water, and consequently less power is required to operate the machine.

In Fig. 10, I have shown a modification of the means for advancing the crates into the tank. The tracks 44 are the same as in the other structure. The carriage for advancing the crates is denoted by 141, and is substantially the same as that shown in the other figures. A pair of links 142 are pivotally connected at their outer ends to the carriage and at their inner ends are likewise pivotally connected to the upper end of an arm 143 and a bell crank lever 144, said arm and lever being secured to the rocker shaft 145. The lower short arm of the bell crank lever 144 is connected by a link 146 to a pivoted arm or lever 147 provided with a treadle 148 and a hand lever 149. By operating the lever 147 either by hand or by foot the carriage may be moved to and fro and the crates introduced into the machine.

While the spindle mechanism is in practice used in conjunction with the other portions of the apparatus, it is conceivable that the tank might be employed without the spindles, or that the spindle mechanism might be used without necessarily employing the tank, the bottles having been treated in some other form of apparatus. No claim is made herein to said spindle machine, as that forms the subject-matter of another application to be filed by me, being specifically reserved for such application.

Having thus described my invention, what I claim is:

1. In an apparatus for cleansing bottles, the combination of a tank; means contained within the tank for supporting bottles therein; means for subjecting the bottles to a fluid to cleanse and remove labels therefrom; an endless label-collecting belt passing through and to the outside of the tank; and means for moving said belt, whereby labels which are washed from the bottles will be collected by the belt and carried to the outside of the machine.

2. In an apparatus for cleansing bottles, the combination of a tank; means for holding a series of bottles therein; means for subjecting the bottles within the tank to the action of a cleansing fluid; an endless wire belt passing through the tank and to the outside thereof; and means for moving said belt, whereby the labels washed from the bottles will be caught by the belt and carried to the outside of the machine.

3. In an apparatus for cleansing bottles, the combination of a tank; means contained in the upper portion thereof for holding a series of bottles; means for subjecting the bottles to the action of water or other cleansing fluid; a false floor located within the lower portion of the tank and extending from one end thereof to a point adjacent to the opposite end; a flexible belt located at one end of the tank, a portion of said belt being situated on a level below that of the false floor; and means for advancing the belt, whereby the labels washed from the bottles pass onto the belt and will be carried outside of the machine thereby.

4. In an apparatus for cleansing bottles, the combination of a tank; means contained in the upper portion thereof for holding a series of bottles; means for subjecting said bottles to the action of a cleansing fluid; a partition extending transversely of the tank in the lower portion thereof; a false floor extending from said partition to one end of the tank; a flexible belt mounted in the lower portion of the tank between the partition and the adjacent end of the tank, said belt extending outside of the tank; and means for advancing said belt, whereby the labels washed from the bottles will be caught by the belt and carried to the outside of the machine.

5. In an apparatus for cleansing bottles, the combination of a tank; means contained in the upper portion thereof for holding a series of bottles; means for subjecting said bottles to the action of a cleansing fluid; a cross partition located adjacent to one end of the tank and extending transversely of the lower portion thereof; a false floor extending from said partition to the remote end of the tank, said partition extending upwardly above the height of the floor and provided with an opening at one side above the floor-line and with a second opening below the floor-line; an endless belt extending through the tank and to the outside thereof a portion of the path of the belt lying below the upper opening in the partition; and means for advancing the belt, whereby the cleansing fluid will pass through the upper opening, through the belt, then back to the main portion of the tank and through the lower opening, and the labels will be caught by the belt and carried to the outside of the machine.

6. In an apparatus for cleansing bottles, the combination of a tank; means contained in the upper portion thereof for holding a series of bottles; means for subjecting said bottles to the action of a cleansing fluid; an endless belt extending through the tank and to the outside thereof; means for conducting the cleansing fluid, after it has passed over the bottles, onto the belt; and means for protecting the belt from the direct action of the cleansing fluid, whereby the labels which are caught by the belt will be prevented from being washed off of the same but are carried to the outside of the machine.

7. In an apparatus for cleansing bottles, the combination of a tank; means contained in the upper portion thereof for supporting a series of bottles; means for subjecting said bottles to the action of a cleansing fluid; a cross partition located adjacent to one end of the tank at the lower portion thereof; a false floor extending from said partition to the remote end of the tank, said floor being located below an opening formed in the upper portion of the cross partition and above an opening formed in the lower portion of the partition; an endless belt passing through and to the outside of the tank, the path of the belt within the tank lying between said openings; means for advancing the belt; and a cover-plate extending over the belt within the tank, whereby the cleansing fluid is prevented from falling directly upon the belt.

8. In an apparatus for cleansing bottles, the combination of a tank; means contained therein for holding bottles; means for subjecting the bottles to the action of a cleansing fluid; an endless belt passing through the tank and to the outside thereof; means for directing the cleansing fluid, after it has passed over the bottles, onto said belt; and means located without the tank for removing the labels from the belt.

9. In an apparatus for cleansing bottles, the combination of a tank; means contained in the upper portion thereof for holding a series of bottles; means for subjecting said bottles to the action of a cleansing fluid; an endless belt extending through and to the outside of the tank; means for directing a cleansing fluid onto the belt after it has passed from the bottles; and a brush located outside of the tank and acting on that surface of the belt upon which the labels and the like come to rest.

10. In an apparatus for cleansing bottles, the combination of a tank; means contained within the upper portion thereof for supporting a series of bottles; a pipe located in the upper portion of the tank and adapted to discharge a cleansing fluid onto the bottles; means for withdrawing the cleansing fluid from the lower portion of the tank and forcing the same into said pipe; and means for separating the labels and the like from the cleansing fluid prior to the passage thereof to the forcing means.

11. In an apparatus for cleansing bottles, the combination of a tank; means contained in the upper portion thereof for supporting a series of bottles; a pipe located in the upper portion of the tank and adapted to spray a cleansing fluid upon the bottles; a pump acting to withdraw the fluid from the lower portion of the tank and force the same through the pipe; and an endless belt acting to withdraw the labels from the cleansing fluid prior to its passage to the lower portion of the tank and its entrance into the pump.

12. In an apparatus for cleansing bottles, the combination of a tank; means contained in the upper portion of the tank for holding the bottles to be cleaned; a pipe located in the upper portion of the tank; a partition extending transversely of the tank adjacent to one end thereof, said partition being provided with an opening in its upper portion and with a second opening in its lower portion; a false floor extending from said partition, at a point between the openings, to the remote end of the tank; an endless belt passing through and to the outside of the tank, the path of the belt within the tank being between said openings; and a pump opening into the tank at a point beneath the false floor, said pump discharging into the pipe located in the upper portion of the tank.

13. In an apparatus for cleansing bottles, the combination of a tank adapted to collect the cleansing fluid in the lower portion thereof; a drum rotatively mounted in the upper portion of the tank above the level of the fluid therein; a series of crate-supporting and holding tracks mounted upon said drum; means for rotating the drum; and means for projecting a cleansing fluid upon the bottles mounted in crates which latter are held and supported by the tracks.

14. In an apparatus for cleansing bottles, the combination of a tank adapted to collect the cleansing fluid in the lower portion thereof; a drum rotatively mounted in said tank above the level of the fluid therein; a series of tracks extending lengthwise of the drum; means for rotating the drum; and means for projecting water upon the bottles carried by crates which are in turn supported by the tracks.

15. In an apparatus for cleansing bottles, the combination of a tank adapted to collect the cleansing fluid in the lower portion thereof; a drum mounted in said tank above the level of the fluid therein; a series of tracks carried by the drum; means for rotating the drum; means for spraying a cleansing fluid upon the bottles which are mounted in crates that are in turn supported by the tracks; and means for withdrawing the cleansing fluid from the lower portion of the tank and forcing the same through the spraying means located in the upper portion of the tank.

16. In an apparatus for cleansing bottles, the combination of a tank; a drum located in the upper portion thereof; a pair of frames mounted upon and secured to the drum, said frames being provided with outwardly-projecting brackets; U-shaped tracks mounted upon the outer ends of the brackets and secured thereto; a series of bars supported by the frames and extending longitudinally of the drum; and means for rotating the drum and the attached parts.

17. In an apparatus for cleansing bottles, the combination of a tank; a drum mounted therein; a series of frames carried by said drum; a series of brackets extending outwardly from each of the frames; a series of U-shaped tracks supported by the brackets and extending from the brackets of one frame to those of the other; a clip overlying each adjacent pair of tracks, said clip being secured to the brackets; and a series of bars extending longitudinally of the drum, said bars being secured to the frames, whereby a crate will be embraced by the oppositely-disposed U-shaped tracks and the bottoms of the bottles will rest upon the bars when the crate is in an inverted position.

18. In an apparatus for cleansing bottles, the combination of a tank adapted to collect the cleansing fluid in the lower portion thereof; means contained within said tank above the level of the fluid therein for holding a series of bottle-supporting crates; means for rotating the same, whereby the bottles will periodically be brought into a vertical position in the upper portion of the tank with their mouths uppermost; and a spray pipe located in the upper portion of the tank, said pipe being provided with a series of slots or openings arranged in line with the mouths of the bottles held by the crates, whereby the bottles will be filled.

19. In an apparatus for cleansing bottles, the combination of a tank; means contained therein for holding a series of bottle-crates; a track or way located outside of the tank and in line with an opening formed in the forward face thereof; a carriage movable back and forth upon said track; pivoted fingers carried by said carriage, said fingers being adapted to engage the ends of crates which are placed upon the track; and means for securing the reciprocation of the carriage and thereby moving the crates through the opening in the tank and onto the supporting means mounted therein.

20. In an apparatus for cleansing bottles, the combination of a tank; means contained within the tank for supporting a series of bottle-holding crates; a track or way located without the tank and in line with an opening formed in the forward wall thereof; a reciprocating carriage mounted upon the track; pivoted fingers carried by the carriage; means for reciprocating the carriage; means for securing the periodical rotation of the bottle-holding means within the tank; and means controlled by the movement of the carriage for throwing the means employed to cause the rotation of the bottle-holding means within the tank into and out of operation.

21. In an apparatus for cleansing bottles, the combination of a tank; means located within the tank adapted to support a series of bottle-holding crates; means for securing a step-by-step rotation of said bottle-holding means; a track or way located outside of the tank in line with an opening formed therein; a carriage mounted upon said track; means carried by said carriage for engaging the crates and moving them inwardly into the tank; means for securing the reciprocation of the carriage; and means actuated by the carriage for governing the movement of the means which cause the periodical rotation of the crate-supporting means located within the tank.

22. In an apparatus for cleansing bottles, the combination of a tank; a drum mounted therein; a series of tracks carried by the drum; tracks mounted without the tank in line with an opening formed therein and in line with a pair of tracks carried by the drum; a carriage mounted upon the tracks without the tank; means carried by the carriage for engaging bottle-holding crates and advancing them onto the tracks carried by the drum; means for securing a reciprocatory motion of said carriage; a Geneva movement for imparting a step-by-step rotation to the drum; and means controlled by the movement of the carriage for throwing said Geneva movement into and out of operation.

23. In an apparatus for cleansing bottles, the combination of a tank; a drum mounted therein; a series of tracks supported by the drum and adapted to receive and hold a series of bottle-holding crates; ways mounted outside of the tank in line with a pair of the tracks carried by the drum; a carriage mounted upon said ways; means carried by the carriage for engaging the crates and causing them to be advanced into the tank as the carriage is moved inwardly on the ways; a counterbalance weight secured to the carriage; a cylinder; a piston mounted in the cylinder; connections between said piston and the carriage, whereby the carriage will be moved inwardly as the piston is actuated in one direction; a Geneva movement for securing the rotation of the drum; and means controlled by the movement of the carriage for throwing the Geneva movement into and out of operation, whereby the crates will be introduced into the tank while the drum is at rest.

24. In an apparatus for cleansing bottles, the combination of a tank; rotary means contained therein for supporting a series of bottle-holding crates; means for subjecting the bottles to the action of a cleansing fluid; a track located in line with a discharge opening formed in the rear end of the tank; and a series of spray pipes located below the track and adapted to inject water into the bottles while they are supported by said track over the pipes.

25. In an apparatus for cleansing bottles, the combination of a tank; rotary means mounted therein for holding a series of bottle-holding crates; means for subjecting the bottles to the action of a cleansing fluid; a track located in line with a discharge opening formed in the rear end of the tank; a pan located at a point below the track; and a series of spray pipes mounted in the upper portion of the pan in line with the mouths of the bottles which are sustained by the track.

26. In an apparatus for cleansing bottles, the combination of a tank; rotary means contained therein for holding a series of bottle-holding crates; means for subjecting the bottles to the action of a cleansing fluid; a track located outside of the tank in line with a discharge opening formed in the rear end thereof; a series of spray pipes located at a point below the track; and a series of spindles adapted to be passed into the bottles and to finally cleans the interior of the same.

27. In an apparatus for cleansing bottles, the combination of a tank; means contained therein for supporting a series of bottle-holding crates; a carriage adapted to advance the crates into the tank; a cylinder; a piston mounted in the cylinder; connections intermediate the cylinder and the carriage; a series of spindles arranged in line with a discharge opening formed in the rear end of the tank; a piston adapted to elevate said spindles; a pump; a pipe leading from the pump to the first-named piston; a pipe leading from the pump to the second-named piston; and valves for controlling the passage of fluid from the pump to said pipes, said valves being located within easy reach of the operator, whereby the machine may be controlled from a single point.

28. In an apparatus for cleansing bottles, the combination of a tank; means contained therein for supporting a series of bottle-holding crates; a carriage located outside of the tank for advancing the crates into the same; a cylinder; a piston mounted therein; connections between said piston and the carriage; a brush located in line with an opening formed in the discharge end of the tank; a pipe discharging onto the brush; a source of fluid supply; and a three-way valve controlling the passage of fluid from the source through the pipe leading to the cylinder and permitting the exhaust from the cylinder to pass to the pipe which discharges to the brush.

29. In an apparatus for cleansing bottles, the combination of a tank; means contained within the tank for supporting bottles therein; means for subjecting the bottles to the action of a cleansing fluid while within the tank; an endless label-catching belt passing beneath the bottle-supporting and bottle-cleansing means; and means for moving the belt.

30. In an apparatus for cleansing bottles, the combination of a tank; means contained therein for supporting the bottles to be cleaned; means for subjecting the bottles to the action of a cleansing fluid while within the tank; an endless label-catching belt passing beneath the bottle-supporting and bottle-cleansing means; means for traversing the belt; and means for removing the labels from the belt.

31. In an apparatus of the character set forth, the combination of a tank; a conveyer in said tank and extending outside of the same; means for supporting bottles above said conveyer and in said tank; means for supplying liquid to the bottles in said tank; and means for driving the conveyer.

32. In an apparatus for cleansing bottles, the combination of a tank; means contained within the tank for supporting bottles therein; means for subjecting the bottles to a fluid to cleanse and remove labels therefrom; an endless, reticulated label-collecting belt passing through and to the outside of the tank; and means for moving said belt, whereby labels which are washed from the bottles will be collected by the belt and carried to the outside of the apparatus.

33. In an apparatus for cleansing bottles, the combination of a tank; means contained within the tank for supporting bottles therein; means for subjecting the bottles to the action of a cleansing fluid while within the tank; an endless reticulated label-catching belt passing beneath the bottle-supporting and bottle-cleansing means; means for removing the labels from the belt without the tank; and means for moving the belt.

34. In an apparatus for cleansing bottles, the combination of a tank; means associated therewith for supporting the bottles to be cleaned; means for subjecting the bottles to the action of a cleansing fluid; a reticular label-catching device, passing beneath the bottle-supporting means and adapted to gather the detached labels; means for actuating the same and carrying the detached labels and the like to a point without the tank; and means for removing the labels from said label-catching device.

35. In an apparatus for cleaning bottles, the combination of a tank; means located in the upper portion thereof for supporting the bottles to be cleaned; spray devices located in the upper portion of the tank, adapted to project the cleaning fluid onto the bottles; a pump in communication with the lower portion of the tank and said spray devices; and a movable intercepter conveyer working in the tank and adapted to collect the labels from the cleaning fluid, whereby the fluid may be continuously used.

36. In an apparatus for cleaning bottles, the combination of a tank; means located in the upper portion thereof for supporting the bottles to be cleaned; spray devices located in the upper portion of the tank adapted to project the cleaning fluid onto the bottles; a pump in communication with the lower portion of the tank and said spray devices; a movable intercepter conveyer working in the tank and adapted to collect the labels from the cleaning fluid; and means for directing the fluid and labels onto said conveyer.

37. In an apparatus of the character set forth, the combination of an intercepting label-conveyer; means for supporting bottles above said conveyer independently thereof; means for supplying liquid to the bottles thus supported; and means for driving said conveyer, whereby the labels detached from the bottles will be removed from the apparatus.

In testimony whereof I have signed my name to this specification in the presence of two subscribing witnesses.

OTTO EICK.

Witnesses:
 OSCAR R. MEYERS,
 HOWARD GORDON.